(12) United States Patent
Jones et al.

(10) Patent No.: US 10,928,801 B2
(45) Date of Patent: Feb. 23, 2021

(54) MANUFACTURING STATISTICAL PROCESS CONTROL IN THE PRESENCE OF MULTIPLE BATCH EFFECTS

(71) Applicant: The Boeing Company, Chicago, IL (US)

(72) Inventors: Lindsay L. W. Jones, Madison, AL (US); Kelsea Cox, Daniel Island, SC (US); Robert M. Lawton, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 173 days.

(21) Appl. No.: 16/184,293

(22) Filed: Nov. 8, 2018

(65) Prior Publication Data

US 2020/0150619 A1    May 14, 2020

(51) Int. Cl.
    G05B 19/406    (2006.01)
(52) U.S. Cl.
    CPC .. G05B 19/406 (2013.01); *G05B 2219/32368* (2013.01); *G05B 2219/42001* (2013.01)
(58) Field of Classification Search
    CPC ........ G05B 19/406; G05B 2219/32368; G05B 2219/42001
    See application file for complete search history.

(56) References Cited

U.S. PATENT DOCUMENTS

| | | | |
|---|---|---|---|
| 2014/0005981 A1* | 1/2014 | Loffler | G06F 17/18 702/181 |
| 2016/0109879 A1* | 4/2016 | Dunlop | G05B 19/418 702/81 |
| 2018/0292811 A1* | 10/2018 | Baseman | G05B 13/0265 |
| 2019/0271971 A1* | 9/2019 | Dunlop | G05B 19/41875 |

OTHER PUBLICATIONS

Joglekar, "Statistical Methods for Six Sigma in R&D and Manufacturing," John Wiley & Sons, Inc., 2003, 321 pages.
Scholz, "Tolerance Bounds and Cpk Confidence Bounds Under Batch Effects," published in Advances in Stochastic Models for Reliability, Quality and Safety, Chapter 24, Boston, 1998, pp. 1-18.

* cited by examiner

*Primary Examiner* — Christopher E. Everett
(74) *Attorney, Agent, or Firm* — MH2 Technology Law Group LLP

(57) ABSTRACT

Techniques for qualifying for use in an overall manufacturing process items produced by a bulk manufacturing process that has a plurality of batch effects are presented. The techniques can include obtaining a collection of items produced by a bulk manufacturing process that has a plurality of batch effects; measuring a quantifiable property of a sample of items from the collection of items; developing a linear mixed model for the quantifiable property based on the measuring; determining a statistical process control standard deviation for the collection of items based on the linear mixed model; computing a statistical process control parameter from the statistical process control standard deviation; determining that at least a portion of the collection of items conform to the statistical process control parameter; accepting at least a portion of the collection of items; and using at least a portion of the collection of items in the overall manufacturing process.

32 Claims, 13 Drawing Sheets

$$y_{ijk\ldots} = a + h_j + m_k + \cdots + e_{ijk\ldots}$$

$$C_{pk} = \min\left(\frac{USL - \hat{\mu}}{3\left(\left(\sum_{i=1}^{B} \widehat{\sigma_i^2}\right) + \widehat{\sigma_e^2}\right)}, \frac{\hat{\mu} - LSL}{3\left(\left(\sum_{i=1}^{B} \widehat{\sigma_i^2}\right) + \widehat{\sigma_e^2}\right)}\right)$$

$$C_{pk}^* = \sqrt{\frac{n-1}{n}} \frac{1}{3\sqrt{n^*-1}} t_{n^*-1, C_0\sqrt{n^*}, 1-\alpha}$$

↑
702

$$n^* = \left( \frac{\sum_{i=1}^{B} \widehat{\sigma_i^2}}{(\sum_{i=1}^{B} \widehat{\sigma_i^2}) + \widehat{\sigma_e^2}} \sum_{j \in J} \left(\frac{n_j}{n}\right)^2 + \frac{1}{n} \frac{\widehat{\sigma_e^2}}{\sum_{i=1}^{B} \widehat{\sigma_i^2} + \widehat{\sigma_e^2}} \right)^{-1}$$

$$CL = \hat{\mu}$$
↗
802

$$UCL = \hat{\mu} + 3s$$
↗
804

$$LCL = \hat{\mu} - 3s$$
↗
806

FIG. 8

$$CL = d_2\sqrt{\widehat{\sigma_e^2}}$$

↗
902

$$UCL = d_2\sqrt{\widehat{\sigma_e^2}} + (D_4 - 1)d_2\sqrt{\widehat{\sigma_e^2}}$$

↗
904

$$LCL = d_2\sqrt{\widehat{\sigma_e^2}} + (D_3 - 1)d_2\sqrt{\widehat{\sigma_e^2}}$$

$$1002 \begin{cases} CL = d_2 \sqrt{\widehat{\sigma_h^2} + \frac{\widehat{\sigma_e^2}}{n_{samp}}} \quad \leftarrow 1004 \\[6pt] UCL = d_2 \sqrt{\widehat{\sigma_h^2} + \frac{\widehat{\sigma_e^2}}{n_{samp}}} + (D_4 - 1)d_2 \sqrt{\widehat{\sigma_h^2} + \frac{\widehat{\sigma_e^2}}{n_{samp}}} \quad \leftarrow 1006 \\[6pt] LCL = d_2 \sqrt{\widehat{\sigma_h^2} + \frac{\widehat{\sigma_e^2}}{n_{samp}}} + (D_3 - 1)d_2 \sqrt{\widehat{\sigma_h^2} + \frac{\widehat{\sigma_e^2}}{n_{samp}}} \quad \leftarrow 1008 \end{cases}$$

$$1010 \begin{cases} CL = d_2 \sqrt{\widehat{\sigma_m^2} + \frac{\widehat{\sigma_e^2}}{n_{samp}}} \quad \leftarrow 1012 \\[6pt] UCL = d_2 \sqrt{\widehat{\sigma_m^2} + \frac{\widehat{\sigma_e^2}}{n_{samp}}} + (D_4 - 1)d_2 \sqrt{\widehat{\sigma_m^2} + \frac{\widehat{\sigma_e^2}}{n_{samp}}} \quad \leftarrow 1014 \\[6pt] LCL = d_2 \sqrt{\widehat{\sigma_m^2} + \frac{\widehat{\sigma_e^2}}{n_{samp}}} + (D_3 - 1)d_2 \sqrt{\widehat{\sigma_m^2} + \frac{\widehat{\sigma_e^2}}{n_{samp}}} \quad \leftarrow 1016 \end{cases}$$

$$1018 \begin{cases} CL = d_2 \sqrt{\widehat{\sigma_m^2} + \widehat{\sigma_h^2} + \frac{\widehat{\sigma_e^2}}{n_{samp}}} \quad \leftarrow 1020 \\[6pt] UCL = d_2 \sqrt{\widehat{\sigma_m^2} + \widehat{\sigma_h^2} + \frac{\widehat{\sigma_e^2}}{n_{samp}}} + (D_4 - 1)d_2 \sqrt{\widehat{\sigma_m^2} + \widehat{\sigma_h^2} + \frac{\widehat{\sigma_e^2}}{n_{samp}}} \quad \leftarrow 1022 \\[6pt] LCL = d_2 \sqrt{\widehat{\sigma_m^2} + \widehat{\sigma_h^2} + \frac{\widehat{\sigma_e^2}}{n_{samp}}} + (D_3 - 1)d_2 \sqrt{\widehat{\sigma_m^2} + \widehat{\sigma_h^2} + \frac{\widehat{\sigma_e^2}}{n_{samp}}} \quad \leftarrow 1024 \end{cases}$$

FIG. 10

MANUFACTURING STATISTICAL PROCESS CONTROL IN THE PRESENCE OF MULTIPLE BATCH EFFECTS

FIELD

This disclosure relates to manufacturing, and more particularly to statistical process control for manufacturing.

BACKGROUND

In the production of parts for a manufacturing process, it is often beneficial to implement statistical process control, e.g., in order to demonstrate the consistency of a process and to reduce the cost associated with testing each part produced. In order to implement statistical process control, a process may first be qualified by demonstrating that the process meets a specific, predefined requirement, usually stated in terms of a process capability index. Additionally, control charts may be developed to track changes in the process over time. However, known techniques to qualify a process and to perform control charting do not work in the presence of more than one batch effect. In particular, using known techniques in the presence of multiple batch effects can result in not only rejecting items and processes that are actually compliant, but also qualifying out-of-compliance items and processes such that quality suffers.

SUMMARY

According to one or more embodiments, a method of qualifying for use in an overall manufacturing process items produced by a bulk manufacturing process that has a plurality of batch effects is disclosed. The method includes obtaining a collection of items produced by a bulk manufacturing process that has a plurality of batch effects; measuring a quantifiable property of a sample of items from the collection of items; developing a linear mixed model for the quantifiable property based on the measuring; determining a statistical process control standard deviation for the collection of items based on the linear mixed model; computing a statistical process control parameter from the statistical process control standard deviation; determining that at least a portion of the collection of items conform to the statistical process control parameter; accepting the at least a portion of the collection of items; and using the at least a portion of the collection of items in the overall manufacturing process.

Various optional features of the above embodiments include the following. The collection of items may include a plurality of forged metal parts. The plurality of batch effects may include at least a heat treatment batch effect and a mill heat batch effect. The statistical process control parameter may include a process capability index requirement. The method may include implementing a statistical process control reduced sampling plan for at least one future collection of items produced by the bulk manufacturing process that has the plurality of batch effects. The process capability index requirement may be of the form $$C_{pk}^* = \sqrt{\frac{n-1}{n}} \frac{1}{3\sqrt{n^*-1}} t_{n^*-1, C_0\sqrt{n^*}, 1-\alpha},$$

where n is a total sample size, $$n^* = \left( \frac{\sum_{i=1}^{B} \widehat{\sigma_i^2}}{(\sum_{i=1}^{B} \widehat{\sigma_i^2}) + \widehat{\sigma_e^2}} \sum_{j \in J} \left(\frac{n_j}{n}\right)^2 + \frac{1}{n} \frac{\widehat{\sigma_e^2}}{\sum_{i=1}^{B} \widehat{\sigma_i^2} + \widehat{\sigma_e^2}} \right)^{-1},$$

B represents a number of batch effects, J represents a set of possible batch effect level combinations from all batch effects, $\hat{\sigma}_i$ represents a standard deviation for batch effect i, $\hat{\sigma}_e$ represents a standard deviation representing a within-batch variation, $n_j$ represents a sample size of items in batch effect level combination j, and $t_{n^*-1, C_0\sqrt{n^*}, 1-\alpha}$ represents a $(1-\alpha)$ quantile of a non-central t-distribution with $n^*$ degrees of freedom and non-centrality parameter $C_0\sqrt{n^*}$, where $\alpha$ is a Type I error rate associated with a confidence level. The statistical process control parameter may include at least one of an upper control limit or a lower control limit. The collection of items may consist of a plurality of disjoint subsets of items, each subset consisting of items affected by a combination of batch effects from the plurality of batch effects, and the statistical process control parameter may include at least one of a moving range chart upper control limit for a particular subset consisting of items affected by a particular combination of batch effects of the plurality of batch effects or a moving range chart lower control limit for a particular subset consisting of items affected by a particular combination of batch effects of the plurality batch effects. The statistical process control parameter may include at least one of an upper control limit of the form $\hat{\mu}+3s$ or $$d_2\sqrt{\widehat{\sigma_e^2}}(D_4-1)d_2\sqrt{\widehat{\sigma_e^2}},$$

or a lower control limit of the form $\hat{\mu}-3s$ or $$d_2\sqrt{\widehat{\sigma_e^2}} + (D_3-1)d_2\sqrt{\widehat{\sigma_e^2}},$$

where $\hat{\mu}$ represents a mean associated with the quantifiable property, $$s = \sqrt{(\sum_{i=1}^{B} \widehat{\sigma_i^2}) + \frac{\widehat{\sigma_e^2}}{n_{samp}}},$$

B represents a number of batch effects, $d_2$ represents a constant for control charting, $D_4$ represents a constant for control charting, $\hat{\sigma}_i$ represents a standard deviation of batch effect i out of the plurality of batch effects, $\hat{\sigma}_e$ represents a standard deviation of an error term representing a within-batch variation, and $n_{samp}$ represents a number of samples per batch effect combination that are to be measured under the chosen sampling plan strategy. The method may include continuing a statistical process control reduced sampling plan for at least one future collection of items produced by the bulk manufacturing process that has the plurality of batch effects. The plurality of batch effects may include a first batch effect crossed with a second batch effect. The plurality of batch effects may include a first batch effect nested in a second batch effect. The linear mixed model for the quantifiable property may include a first standard deviation of a first batch effect, a second standard deviation of a second batch effect, and a third standard deviation of an error term representing a within-batch variation; and the statistical process control standard deviation for the collection of items based on the linear mixed model may include the first standard deviation, the second standard deviation, and the third standard deviation. The statistical process control standard deviation for the collection of items based on the linear mixed mode may be determined by computing $$\hat{\sigma} = \sqrt{\left(\sum_{i=1}^{B} \hat{\sigma}_i^2\right) + \hat{\sigma}_e^2},$$

where $\hat{\sigma}_i$ represents the standard deviation of batch effect i out of a plurality of B batch effects, and $\hat{\sigma}_e$ represents the third standard deviation of the error term representing the within-batch variation. The linear mixed model may be developed as $y_{ijk\ldots} = a + h_j + m_k + \ldots + e_{ijk\ldots}$, where $y_{ijk\ldots}$ represents the quantifiable property for an i-th item in a j-th batch of a first batch effect and the k-th batch of a second batch effect with additional indices for additional batch effects, a represents a model intercept, $h_j$ represents a j-th batch of the first batch effect, $m_k$ represents a k-th batch of the second batch effect, " . . . " represents additional terms for additional batch effect variables, and $e_{ijk\ldots}$ represents a within-batch variation. The statistical process control parameter may include a process capability index. The process capability index may be of the form $$C_{pk} = \left(\frac{USL - \hat{\mu}}{3(\sqrt{(\sum_{i=1}^{B} \hat{\sigma}_i^2) + \hat{\sigma}_e^2})}, \frac{\hat{\mu} - LSL}{3(\sqrt{(\sum_{i=1}^{B} \hat{\sigma}_i^2) + \hat{\sigma}_e^2})}\right),$$

where USL represents an upper specification limit, LSL represents a lower specification limit, $\hat{\mu}$ represents a mean of the quantifiable property, $\hat{\sigma}_I$ represent a standard deviation of batch effect I from the plurality of batch effects, and $\hat{\sigma}_e$ represents a standard deviation of an error term representing a within-batch variation.

According to one or more embodiments, a system for qualifying for use in an overall manufacturing process items produced by a bulk manufacturing process that has a plurality of batch effects is disclosed. The system includes a test bed for measuring a quantifiable property of a sample of items from a collection of items produced by a bulk manufacturing process that has a plurality of batch effects; and an electronic computer including at least one electronic processor that executes instructions to perform operations including: developing a linear mixed model for the quantifiable property based on the measuring, determining a statistical process control standard deviation for the collection of items based on the linear mixed model, computing a statistical process control parameter from the statistical process control standard deviation, and determining that at least a portion of the collection of items conform to the statistical process control parameter; where the at least a portion of the collection of items are accepted and used in the overall manufacturing process.

Various optional features of the above embodiments include the following. The collection of items may include a plurality of forged metal parts. The plurality of batch effects may include at least a heat treatment batch effect and a mill heat batch effect. The statistical process control parameter may include a process capability index requirement. The process capability index requirement may be of the form $$C_{pk}^* = \sqrt{\frac{n-1}{n}} \frac{1}{3\sqrt{n^*-1}} t_{n^*-1, C_0\sqrt{n^*}, 1-\alpha},$$

where n is a total sample size, $$n^* = \left(\frac{\sum_{i=1}^{B} \hat{\sigma}_i^2}{(\sum_{i=1}^{B} \hat{\sigma}_i^2) + \hat{\sigma}_e^2} \sum_{j \in J} \left(\frac{n_j}{n}\right)^2 + \frac{1}{n} \frac{\hat{\sigma}_e^2}{\sum_{i=1}^{B} \hat{\sigma}_i^2 + \hat{\sigma}_e^2}\right)^{-1},$$

B represents a number of batch effects, $\hat{\sigma}_i$ represents a standard deviation for batch effect i, $\hat{\sigma}_e$ represents a standard deviation representing a within-batch variation, $n_j$ represents a sample size of items in batching level combination j, and $t_{n^*-1, C_0\sqrt{n^*}, 1-\alpha}$ represents a (1-α) quantile of a non-central t-distribution with n* degrees of freedom and non-centrality parameter $C_0\sqrt{n^*}$, where α is a Type I error rate associated with a confidence level. The statistical process control parameter may include at least one of an upper control limit or a lower control limit. The collection of items may consist of a plurality of disjoint subsets of items, each subset consisting of items affected by a combination of batch effects from the plurality of batch effects, and the statistical process control parameter may include at least one of a moving range chart upper control limit for a particular subset consisting of items affected by a particular combination of batch effects of the plurality of batch effects or a moving range chart lower control limit for a particular subset consisting of items affected by a particular combination of batch effects of the plurality batch effects. The statistical process control parameter may include at least one of an upper control limit of the form μ+3s or $$d_2\sqrt{\hat{\sigma}_e^2} + (D_4 - 1)d_2\sqrt{\hat{\sigma}_e^2},$$

or a lower control limit of the form $\hat{\mu}$-3s or $$d_2\sqrt{\hat{\sigma}_e^2} + (D_3 - 1)d_2\sqrt{\hat{\sigma}_e^2},$$

where $\hat{\mu}$ represents a mean associated with the quantifiable property, $$S = \sqrt{(\sum_{i=1}^{B} \hat{\sigma}_i^2) + \frac{\hat{\sigma}_e^2}{n_{samp}}},$$

B represents a number of batch effects, $d_2$ represents a constant for control charting, $D_4$ represents a constant for control charting, $\hat{\sigma}_i$ represents a standard deviation for batch effect i, and $\hat{\sigma}_e$ represents a standard deviation of an error term representing within-batch variation. The plurality of batch effects may include a first batch effect crossed with a second batch effect. The plurality of batch effects may include a first batch effect nested in a second batch effect.

The linear mixed model for the quantifiable property may include a first standard deviation of a first batch effect, a second standard deviation of a second batch effect, and a third standard deviation of an error term representing a within-batch variation; and the statistical process control standard deviation for the collection of items based on the linear mixed model may include a first standard deviation, a second standard deviation, and a third standard deviation. The statistical process control standard deviation for the collection of items based on the linear mixed mode may be determined by computing $$\hat{\sigma} = \sqrt{\left(\sum_{i=1}^{B} \widehat{\sigma_i^2}\right) + \widehat{\sigma_e^2}},$$

where $\hat{\sigma}_i$ represents a standard deviation of batch effect i of the plurality of batch effects, B represents a number of batch effects, and $\widehat{\sigma_e}$ represents the third standard deviation of the error term representing the within-batch variation. The linear mixed model may be developed as $y_{ijk\ldots} = a + h_j + m_k + \ldots + e_{ijk\ldots}$, where $y_{ijk\ldots}$ represents the quantifiable property of the i-th item in a j-th batch of a first batch effect and a k-th batch of a second batch effect with possible additional indices for additional batch effects, a represents a model intercept, $h_j$ represents a j-th batch of the first batch effect, $m_k$ represents the k-th batch of the second batch effect, "..." represents additional terms for additional batch effect variables, and $e_{ijk\ldots}$ represents a within-batch variation. The statistical process control parameter may include a process capability index. The process capability index may be of the form $$C_{pk} = \min\left(\frac{USL - \hat{\mu}}{3\left(\left(\sum_{i=1}^{B} \widehat{\sigma_i^2}\right) + \widehat{\sigma_e^2}\right)}, \frac{\hat{\mu} - LSL}{3\left(\left(\sum_{i=1}^{B} \widehat{\sigma_i^2}\right) + \widehat{\tau_e^2}\right)}\right),$$

where B represents a number of batch effects, USL represents an upper specification limit, LSL represents a lower specification limit, $\hat{\mu}$ represents a mean of the quantifiable property, $\hat{\sigma}_i$ represents a standard deviation of batch effect i out of the plurality of batch effects, and $\widehat{\sigma_e}$ represents a standard deviation of an error term representing a within-batch variation.

BRIEF DESCRIPTION OF THE DRAWINGS

The accompanying drawings, which are incorporated in and constitute a part of this specification, illustrate the present teachings and together with the description, serve to explain the principles of the disclosure.

FIG. 5 depicts a formula for a linear mixed model according to one or more embodiments;

FIG. 6 depicts a formula for a process capability index according to one or more embodiments;

FIG. 7 depicts a formula for a process capability index requirement and a formula for an effective sample size according to one or more embodiments;

FIG. 8 depicts center line, upper control limit, and lower control limit formulas for x-bar and individual control charts according to one or more embodiments;

FIG. 9 depicts center line, upper control limit, and lower control limit formulas for range control charts according to one or more embodiments;

FIG. 10 depicts center line, upper control limit, and lower control limit formulas for moving range control charts for two crossed batch effects according to one or more embodiments;

Figure 1:
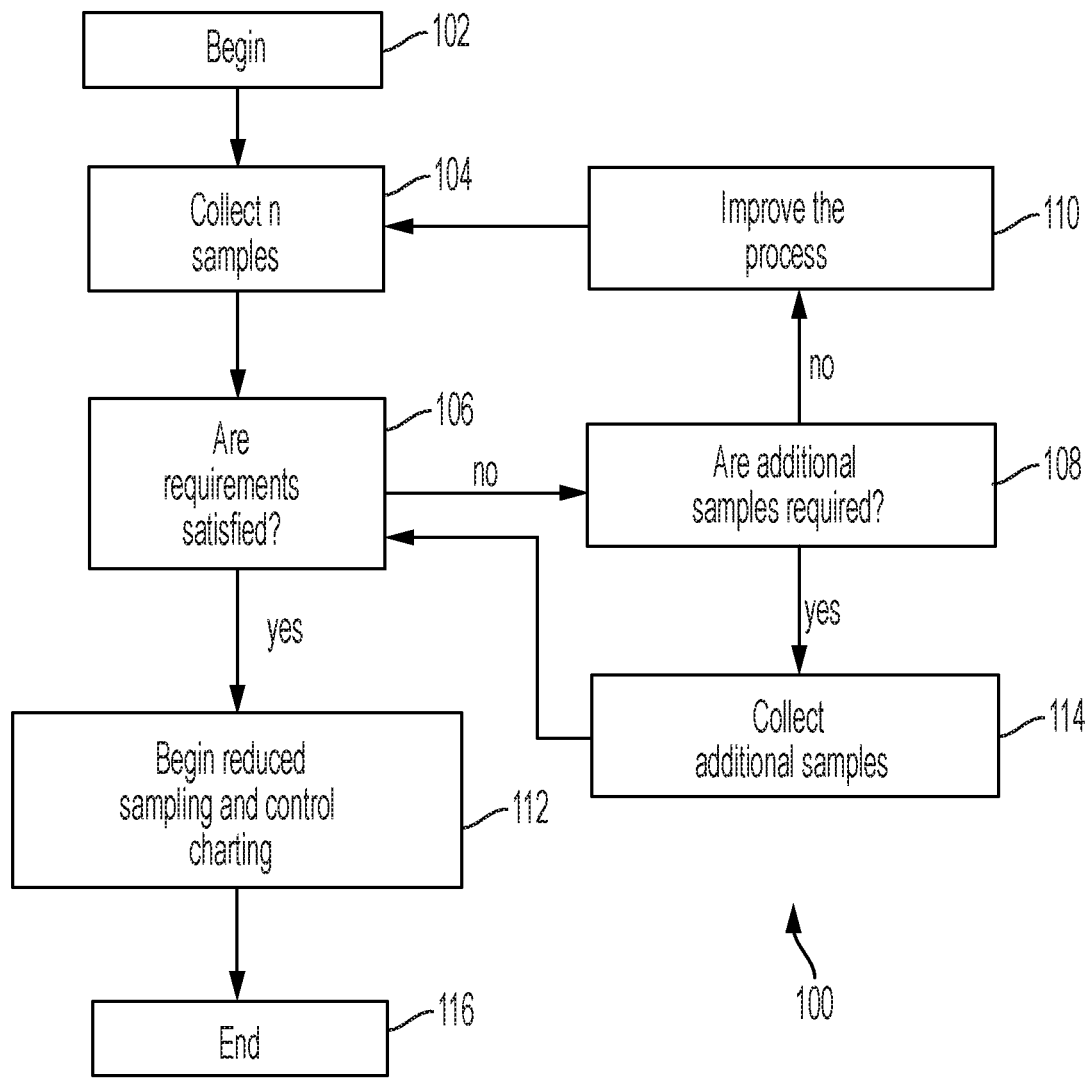
FIG. 1 is a flow diagram of a statistical process control technique according to one or more embodiments.

It should be noted that some details of the figures have been simplified and are drawn to facilitate understanding of the present teachings, rather than to maintain strict structural accuracy, detail, and scale.

DETAILED DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

Statistical process control implementation can greatly reduce testing costs for parts suppliers by reducing the number of units that are to be tested in each lot of materials that is delivered. Through adequate qualification and thorough monitoring of processes, the risk of escape, i.e., that an out-of-spec part is utilized, can be well controlled even though the number of parts that are actually tested is small. In order for the benefits of statistical process control to be realized and the risks to be properly managed, qualification and monitoring are carefully conducted by properly accounting for all relevant aspects of a process. In particular, reduced sampling may be implemented once the statistical process control requirements are met and the process is qualified.

Batch effects are an important aspect of manufacturing processes that are often overlooked. Batch effects occur when parts within a group are more similar to each other than they are to parts in other groups. Multiple batch effects may be generated, for example, from the use of different lots of raw materials for forged metal parts together with the processing of such parts in different heat treat lots. That is, raw materials may come in batches with substantial between-batch variation, and parts may be produced from such raw materials in heat lot batches, again, with substantial between-batch variation.

If batch effects are not properly accounted for, estimates of process variation may be incorrect. Incorrect variance estimates may result in qualification of inadequate suppliers and incorrect control charting if statistical process control is implemented. If an inadequate supplier is qualified, the risk of escape for parts produced by the supplier is increased. Additionally, incorrect control charting may lead to high false alarm rates and thereby increase testing and process monitoring costs. Therefore, it is important to properly account for batch effects for both qualification and control charting. Further, multiple batch effects are common in typical production processes.

FIG. 1 is a flow diagram of a statistical process control technique according to one or more embodiments. Statistical process control is widely used throughout industry to monitor production processes through the use of statistical sampling and charting. The benefits of statistical process control include controlling the fallout rate of accepted material, early problem detection, and continuous process improvement. A successful approach ensures first-time quality by correctly rejecting suppliers that do not meet requirements, saves time and cost by correctly accepting suppliers that meet requirements, and protects buyers from risk of escapes while driving continuous improvement through process monitoring.

As shown in FIG. 1, a statistical process control technique may begin at block 102 with the collecting of a number n of samples at block 104 of an item used in, or produced by, a manufacturing process. The sampling may be of any quantifiable property, e.g., hardness, tensile strength, weight, length, etc. Initially, all items may be sampled, that is, n may equal the number of items to be used or produced.

Next, at block 106, a determination is made as to whether the process qualifies for reduced sampling. Such qualification may be made through the use of a process capability index, denoted $C_{pk}$, which provides a measure of the quality of the process distribution with respect to specification limits, through a comparison to a process capability index requirement, denoted $C_{pk}^*$. A high process capability index is indicative of a low fallout rate. For example, a process capability index equal to one means that 99.7% of a distribution will fall within a two-sided specification under normality. In the absence of batch effects, the process capability index may be defined as follows.

$$C_{pk} = \min\left(\frac{USL - \hat{\mu}}{3\hat{\sigma}}, \frac{\hat{\mu} - LSL}{3\hat{\sigma}}\right) \quad (1)$$

In Equation (1), n is the sample size, $x_i$ is a quantifiable property of sample i, USL represents the supper specification limit, $\hat{\mu}$ is the sample mean $$\hat{\mu} = \frac{1}{n}\sum_{i=1}^{n} x_i,$$

and $\hat{\sigma}$ is the sample standard deviation $$\hat{\sigma} = \frac{1}{n}\sum_{i=1}^{n} (x_i - \hat{\mu})^2.$$

To ensure that a process meets capability requirements, sampling error is taken into account, and thus the requirement incorporates a confidence level. This requirement modification is dependent on sample size. For example, if the requirement states that the process is to produce a $C_{pk}$ of 1.0 with 90% confidence, then the process should provide a $C_{pk}$ of 1.30 with only 20 samples or a $C_{pk}$ of 1.15 with 60 samples. This modified $C_{pk}$ requirement is referred to as the process capability index requirement, denoted $C_{pk}^*$. The $C_{pk}^*$ value decreases (i.e., the requirement is relaxed) as sample size increases or confidence level decreases. Again in the absence of batch effects, the process capability index requirement may be determined as follows.

$$C_{pk}^* = \frac{1}{3\sqrt{n}} t_{n-1, C_0\sqrt{n}, 1-\alpha} \quad (2)$$

In Equation (2), n is the sample size, $\alpha$ is the Type I error rate associated with the confidence level of interest, $C_0$ represents the $C_{pk}$ requirement value, and $t_{n-1, C_0\sqrt{n}, 1-\alpha}$ represents a $(1-\alpha)$ quantile of a non-central t-distribution with n degrees of freedom and non-centrality parameter $C_0\sqrt{n}$.

If, on the one hand, the requirement is satisfied at block 106, i.e., if $C_{pk} \geq C_{pk}^*$, then, per block 112, reduced sampling and process monitoring through the use of control charts may be begin. This may continue until the manufacturing process ends, per block 116.

If, on the other hand, the requirement is not satisfied at block 106, i.e., if $C_{pk} < C_{pk}^*$, then, per block 108, a determination is made as to whether additional samples are required, e.g., if it is at the beginning of the manufacturing process. If so, then additional samples are collected per block 114, and control reverts to block 106. If not, then this is an indication of a flaw in the process or items, and per block 110, steps are taken to improve the manufacturing process or obtain in-compliance items. For example, the manufacturer may audit the manufacturing process, re-calibrate automated manufacturing machinery, or contact a supplier to request a replacement lot of items, if such items led to the out-of-compliance finding.

Thus, once a process meets the $C_{pk}^*$ requirement for the appropriate sample size per block 106, reduced sampling and control charting begin per block 112. Reduced sampling and control charting enables stakeholders to monitor the process without the cost associated with 100% inspection. Sampling plans typically account for the inherent sources of variation in the process. Control charts are used to monitor both trends in central tendency and trends in variation.

Figure 2A:
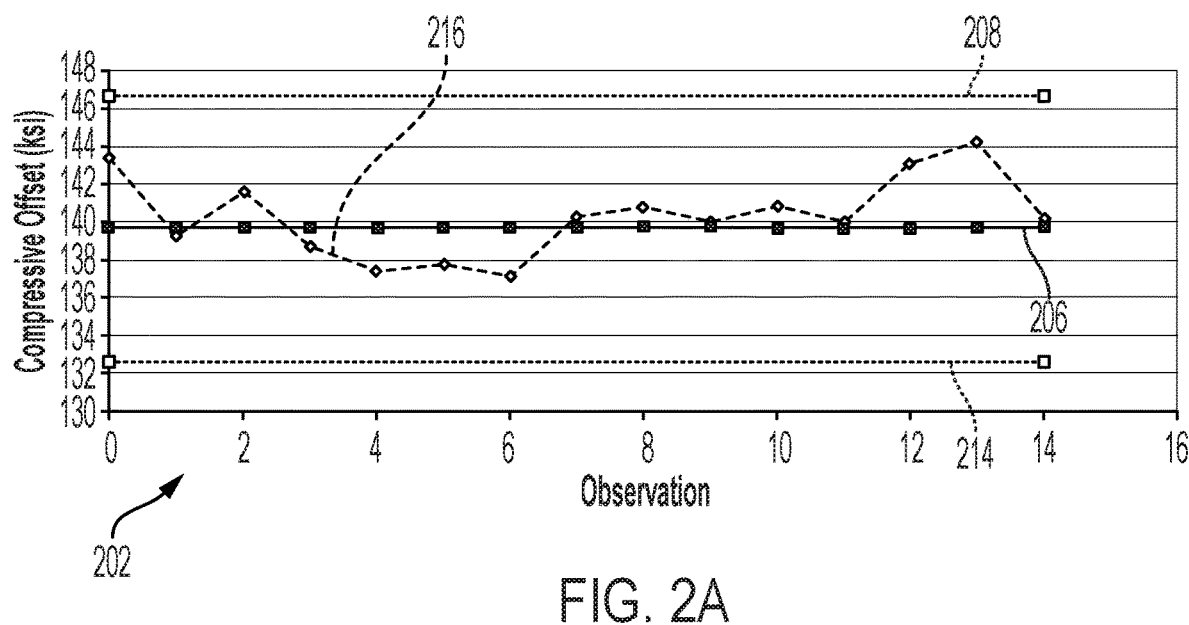
FIG. 2A depicts an individual control chart according to one or more embodiments.
Figure 2B:
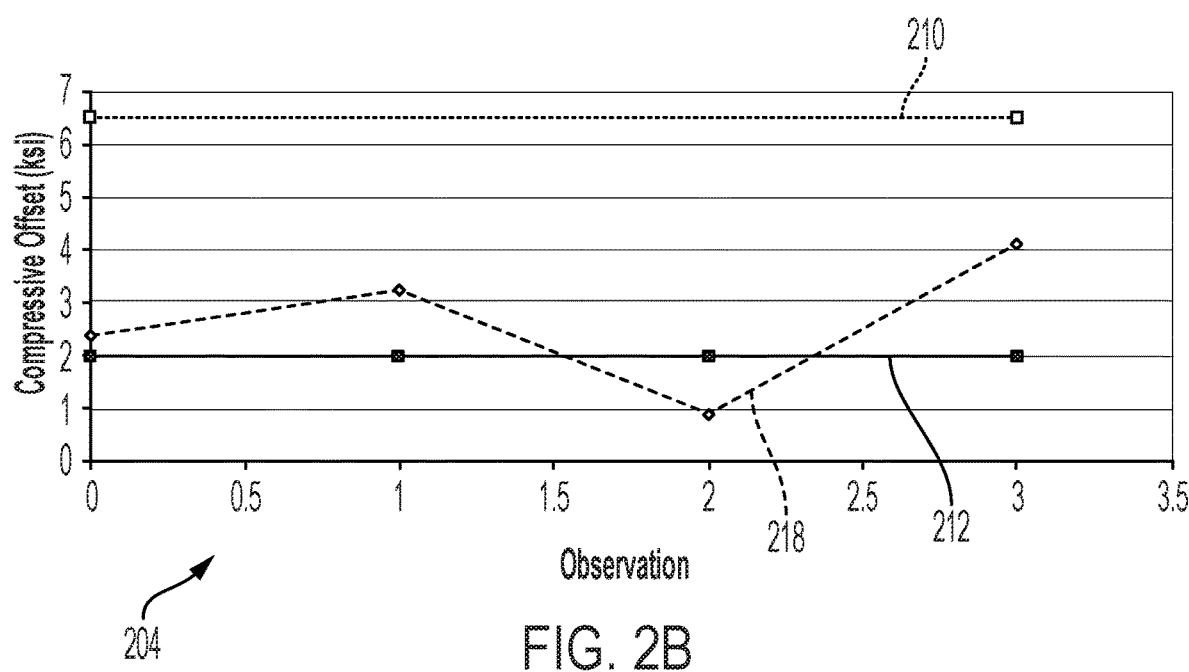
FIG. 2B depicts a moving range control chart according to one or more embodiments.

FIG. 2A depicts an individual control chart 202, and FIG. 2B depicts a moving range control chart 204 with exemplary sample data according to one or more embodiments. In particular, individual control chart 202 depicts a central control line 206, an upper control limit 208, and a lower control limit 214. Individual control chart further depicts sample data 216, which lies between the upper control limit 208 and the lower control limit 214; therefore, the individual control chart 202 represents a compliant process. Moving range control chart 204 depicts an upper control limit 210 and a lower control limit 212. Moving range control chart 204 further depicts sample data 218. As shown, a portion of the sample data 218 lies below the lower control limit 212; therefore, FIG. 2B represents a non-compliant process.

Traditional control charts include a pairing of individual and moving range charts or a pairing of x-bar (mean) and range charts. Individual and moving range charts require a sampling plan such that one sample is collected per lot. In this case, the central tendency of the process distribution is monitored through plotting the individual observations over time on the individual chart, and the variation is monitored through the moving range (the difference in two consecutive observations). If more than one sample is required per lot, then x-bar and range charts may be used to monitor the process. In this case, x-bar charts monitor the average of each set of observations per lot over time and the range charts monitor variation by plotting the range of observations per lot over time.

Computing the process capability index requirement, developing sampling plans, and building control charts becomes very complex when batching exists in the production process. Batching introduces new sources of variation, and the components of statistical process control monitor all sources of variation. A batching effect exists when a correlation structure is present in the production process. Commonly, observations within the same batch will be more similar than observations from different batches. For example, parts created from the same batch of raw metal, or mill heat, tend to be more similar than parts created from two different mill heats. Thus, a "batch effect" refers to a source of multiple batches in a collection of items, where observations within each batch in the multiple batches tend to be more similar than observations from different batches in the multiple batches.

When multiple batching effects exist, the correlation structure is much more complex. Multiple batch effects implicates two (or more) sets of batches, where each set of batches is for a separate batch effect. In the example of mill heats and heat lots, the expectation is that observations from the same heat lot are more similar than observations from different heat lots. Moreover, observations from the same mill heat are more similar than observations from different mill heats. Furthermore, observations from the same mill heat and the same heat lot are more similar than any other combination of mill heat and heat lot. Clearly, the number of batching effects may increase as production processes become more and more complex. As the number of batching effects increases, the number of batch effect combinations to be monitored can increase dramatically. (A "batch effect combination" refers to the items common to a particular batch of a first batch effect, a particular batch of a second batch effect and so on. For example, if A is a batch in a first batch effect and B is a batch in a second batch effect, then A∩B is a "batch effect combination" in a process that has two batch effects from the first and second batch effects.) Furthermore, different types of multiple batching effects exist, and these different types of batching implicate different handling to appropriately account for variation sources in the production process.

Figure 3:
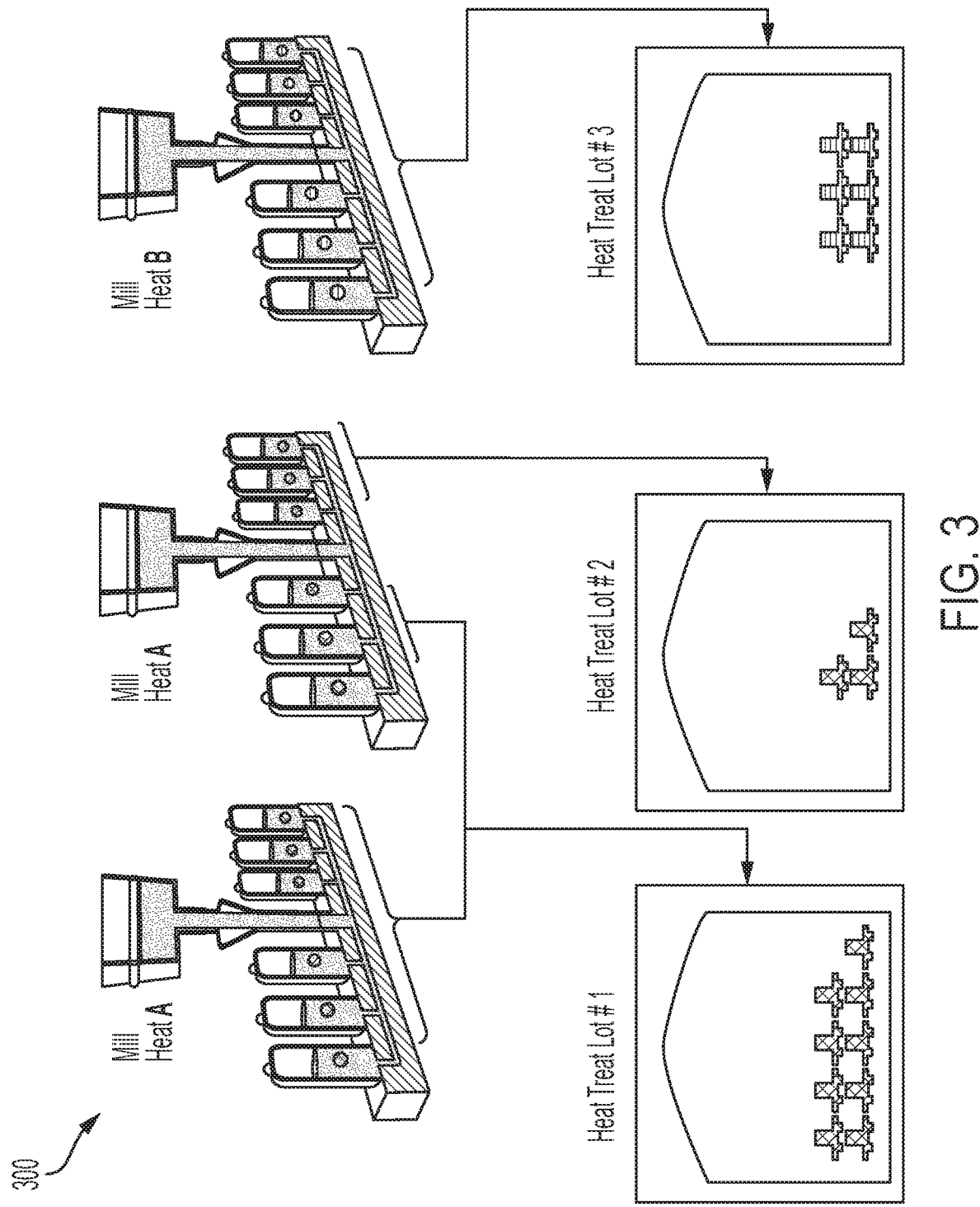
FIG. 3 is a schematic diagram depicting nested multiple batch effects according to one or more embodiments.
Figure 4:
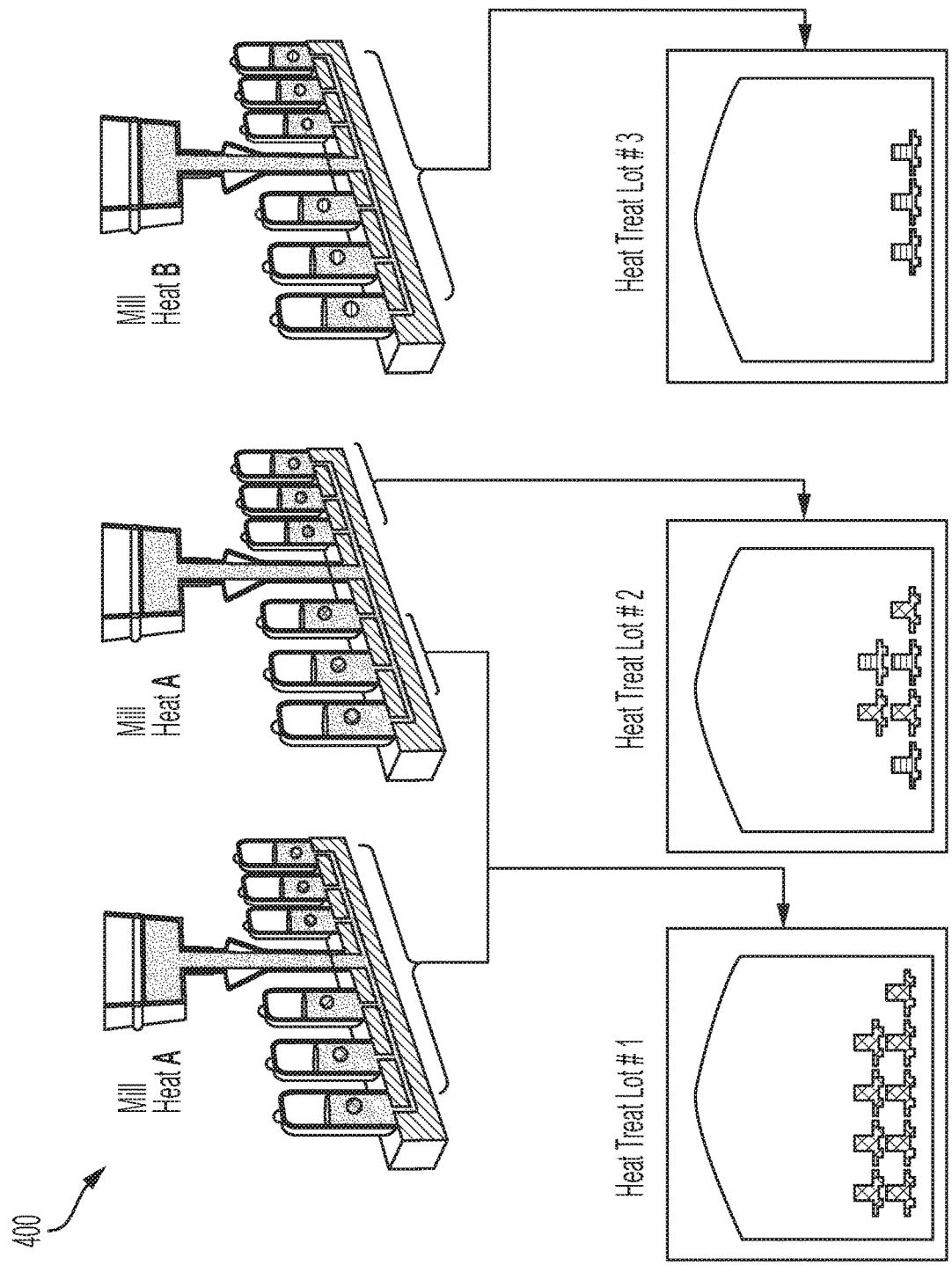
FIG. 4 is a schematic diagram depicting crossed multiple batch effects according to one or more embodiments.

Types of multiple batching effects structures include both nested and crossed batching effects, as described presently in reference to FIGS. 3 and 4.

FIG. 3 is a schematic diagram depicting nested multiple batch effects 300 according to one or more embodiments. Multiple batch effects are "nested" if each batch from one batch effect appears within only one batch of a different batch effect. In FIG. 3, mill heat is a first batch effect, and heat treatment is a second batch effect. The batches in the mill heat batch effect are shown as Mill Heat A and Mill Heat B. The batches in the heat treatment batch effect are Heat Treat Lot #1, Heat Treat Lot #2, and Heat Treat Lot #3. All of the parts in Heat Treat Lots #1 and #2 are made from material from Mill Heat A, and the heat treat lots never contain material from multiple mill heats. Thus, the heat treatment batch effect is nested within the mill heat batch effect.

FIG. 4 is a schematic diagram depicting crossed multiple batch effects 400 according to one or more embodiments. Multiple batch effects are "crossed" if they are not nested, that is, if a single batch of one batch effect appears across multiple batches from a different batch effect. In FIG. 4, material from Mill Heat A is used in both Heat Treat Lots #1 and #2, thus mill heat is crossed with heat treat lot.

Different types of multiple batch effects should be characterized appropriately in the computation of the process capability index requirement and the sampling and control charting plan. Methods currently do not exist to account for multiple batching effects. Thus, some embodiments provide techniques for handling multiple batch effects in the context of statistical process control and provide details for properly estimating the process capability index requirement and for constructing control charts.

The methods for calculating $C_{pk}$ and $C_{pk}*$ described above in reference to Equations (1) and (2) are based upon the assumption of independent samples from a normal distribution. However, when batch effects are present, samples within a batch are correlated and are therefore no longer independent. If the variance or standard deviation of these samples is estimated without accounting for this lack of independence, the produced estimate will be incorrect. Because samples within a batch are typically positively correlated (samples within a batch are more similar to each other than to samples from other batches), the variance of the process will often be underestimated if traditional methods that do not account for batching are used. Underestimation of process variation can lead to overestimation of $C_{pk}$ and underestimation of $C_{pk}*$, which means that an inadequate process could be qualified.

Figure 5:
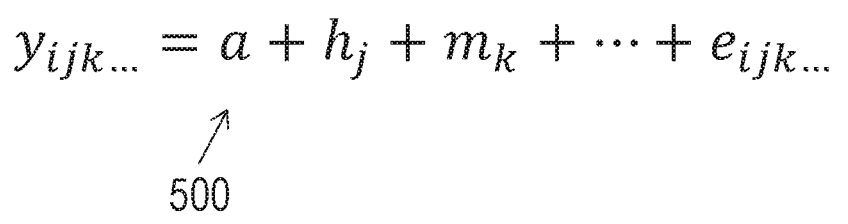

FIG. 5 depicts a formula for a linear mixed model 500 according to one or more embodiments. To calculate the proper variance components to determine $C_{pk}$ or $C_{pk}*$, for example, some embodiments use a linear mixed model. Such a model for the case with two crossed batch effects (one for mill heat of raw metal and one for heat treat lot of forged parts) may be expressed as, by way of non-limiting example:

$$y_{ijk}=\alpha+h_j+m_k+e_{ijk} \quad (3)$$

In Equation (3), $y_{ijk}$ represents a quantifiable property of the i-th item in the j-th batch of a first batch effect and the k-th batch of a second batch effect, α represents a model intercept, $h_j$ represents the j-th batch of the first batch effect, $m_k$ represents the k-th batch of the second batch effect, and $e_{ijk}$ represents within-batch variation. In the model, $h \sim N(0, \sigma_1^2)$ is a first batch effect, $m \sim N(0, \sigma_2^2)$ is a second batch effect, and $e \sim N(0, \sigma_e^2)$ is an error term representing within-batch variation. For example, Equation (3) may be applied to the crossed multiple batch effects depicted in FIG. 4, in which case i represents an observation, j represents a heat treat lot, and k represents a mill heat.

Equation (3) may be generalized to account for any number of batch effects, by way of non-limiting example, as follows.

$$y_{ijk\ldots}=\alpha+h_j+m_k+\ldots+e_{ijk\ldots} \quad (4)$$

In Equation (4), a formula for a linear mixed model 500 for any number of batch effects, $y_{ijk\ldots}$ represents a quantifiable property of the i-th item in the j-th batch of the first batch effect and the k-th batch of the second batch effect, with additional indices for additional batch effects, a represents a model intercept, $h_j$ represents the j-th batch of the first batch effect, $m_k$ represents the k-th batch of the second batch effect, "..." represents additional terms for additional batch effect variables, and $e_{ijk...}$ represents within-batch variation.

FIG. 6 depicts a formula for a process capability index 600 according to one or more embodiments. In particular, the linear mixed model of Equation (4) may be used to determine an estimated process capability index for two crossed batch effects. Such an estimated process capability index for two crossed batch effects may be expressed as follows, by way of non-limiting example:

$$C_{pk} = \min\left(\frac{USL - \hat{\mu}}{3(\widehat{\sigma_1^2} + \widehat{\sigma_2^2} + \widehat{\sigma_e^2})}, \frac{\hat{\mu} - LSL}{3(\widehat{\sigma_1^2} + \widehat{\sigma_2^2} + \widehat{\sigma_e^2})}\right) \quad (5)$$

In Equation (5), USL represents an upper specification limit, LSL represents a lower specification limit, $\hat{\mu}$ represents a mean of the quantifiable property, $\widehat{\sigma_1}$ represents a standard deviation of a first batch effect, $\widehat{\sigma_2}$ represents a standard deviation of a second batch effect, and $\widehat{\sigma_e}$ represents a standard deviation of an error term representing within-batch variation. Note that the denominators of the fractions in Equation (5) include a standard deviation calculation for two batch effects, which may be expressed as follows, by way of non-limiting example:

$$\hat{\sigma} = \sqrt{\widehat{\sigma_1^2} + \widehat{\sigma_2^2} + \widehat{\sigma_e^2}} \quad (6)$$

In Equation (6), as in Equation (5), $\widehat{\sigma_1}$ represents a standard deviation of a first batch effect, $\widehat{\sigma_2}$ represents a standard deviation of a second batch effect, and $\widehat{\sigma_e}$ represents a standard deviation of an error term representing within-batch variation. Equation (6) may be generalized for any number of batch effects, by way of non-limiting example, as follows:

$$\hat{\sigma} = \sqrt{\left(\sum_{i=1}^{B} \widehat{\sigma_i^2}\right) + \widehat{\sigma_e^2}} \quad (7)$$

In Equation (7), B is the number of batch effects, $\hat{\sigma}_i$ represents the standard deviation of batch effect i out of the plurality of B batch effects, and $\widehat{\sigma_e}$ represents a standard deviation $\widehat{\sigma_e}$ of an error term representing within-batch variation.

Further, Equation (5) may be generalized to account for any number of batch effects, by way of non-limiting example, as follows.

$$C_{pk} = \min\left(\frac{USL - \hat{\mu}}{3((\sum_{i=1}^{B} \widehat{\sigma_i^2}) + \widehat{\sigma_e^2})}, \frac{\hat{\mu} - LSL}{3((\sum_{i=1}^{B} \widehat{\sigma_i^2}) + \widehat{\sigma_e^2})}\right) \quad (8)$$

In Equation (8), a general equation for a process capability index (600) in the presence of two or more crossed batch effects, USL represents an upper specification limit, LSL represents a lower specification limit, $\hat{\mu}$ represents a mean of the quantifiable property, $\hat{\sigma}_i$ represent a standard deviation of batch effect i from the plurality of B batch effects, and $\widehat{\sigma_e}$ represents a standard deviation of an error term representing within-batch variation.

FIG. 7 depicts a formula for a process capability index requirement 702 and a formula for an effective sample size 704 according to one or more embodiments. In particular, the linear mixed model of Equation (3) may be used to determine a process capability index requirement 702 for two crossed batch effects. To determine the appropriate value of $C_{pk}^*$ to use for two crossed batch effects, an effective sample size is first determined. For two crossed batch effects, an effective sample size may be represented as, by way of non-limiting example:

$$n^* = \left(\frac{\widehat{\sigma_1^2} + \widehat{\sigma_2^2}}{\widehat{\sigma_1^2} + \widehat{\sigma_2^2} + \widehat{\sigma_e^2}} \sum_{i=1}^{k_1} \sum_{j=1}^{k_2} \left(\frac{n_{ij}}{n}\right)^2 + \frac{1}{n} \frac{\widehat{\sigma_e^2}}{\widehat{\sigma_1^2} + \widehat{\sigma_2^2} + \widehat{\sigma_e^2}}\right)^{-1} \quad (9)$$

In Equation (9), n* represents an effective sample size 704, n represents a total sample size, $k_1$ represents a number of batches in a first batch effect, $k_2$ represents a number of batches in a second batch effect, $\widehat{\sigma_1}$ represents a first standard deviation of the first batch effect, $\widehat{\sigma_2}$ represents a standard deviation of the second batch effect, $\widehat{\sigma_e}$ is an error term, that is, a standard deviation representing within-batch variation, and $n_{ij}$ represents a sample size of items in an i-th batch of the first batch effect and j-th batch of the second batch effect.

With the conventions of Equation (9) for an effective sample size, and with $t_{n^*-1, C_0\sqrt{n^*}, 1-\alpha}$ representing a $(1-\alpha)$ quantile of a non-central t-distribution with n* degrees of freedom and non-centrality parameter $C_0\sqrt{n^*}$, where $\alpha$ is a Type I error rate associated with a confidence level, a corresponding process capability index requirement 702 may be represented, by way of non-limiting example, as follows:

$$C_{pk}^* = \sqrt{\frac{n-1}{n}} \frac{1}{3\sqrt{n^*-1}} t_{n^*-1, C_0\sqrt{n^*}, 1-\alpha} \quad (10)$$

Note that Equation (10) 702 may be used for any number of crossed or nested batch effects by adjusting the formula for n*, e.g., by using all variance terms in the denominator and all batching-related (i.e., non-error) variance terms in the numerator of the term $$\frac{\widehat{\sigma_1^2} + \widehat{\sigma_2^2}}{\widehat{\sigma_1^2} + \widehat{\sigma_2^2} + \widehat{\sigma_e^2}},$$

extending the $$\sum_{i=1}^{k_1} \sum_{j=1}^{k_2} \left(\frac{n_{ij}}{n}\right)^2$$

term to sum over all batching variables (adding summations and indices as appropriate), and using all variance terms in the denominator of the term $$\frac{\widehat{\sigma_e^2}}{\widehat{\sigma_1^2} + \widehat{\sigma_2^2} + \widehat{\sigma_e^2}}.$$

Thus, a generalized formula for the effective batch size 704 in the presence of any number of crossed or nested batch effects may be presented, by way of non-limiting example, as follows.

$$n^* = \left( \frac{\sum_{i=1}^{B} \widehat{\sigma_i^2}}{\left(\sum_{i=1}^{B} \widehat{\sigma_i^2}\right) + \widehat{\sigma_e^2}} \sum_{j \in J} \left(\frac{n_j}{n}\right)^2 + \frac{1}{n} \frac{\widehat{\sigma_e^2}}{\sum_{i=1}^{B} \widehat{\sigma_i^2} + \widehat{\sigma_e^2}} \right)^{-1} \quad (11)$$

In Equation (11), B represents a number of batch effects, J represents a set of possible batch effect level combinations from all batch effects, $\hat{\sigma}_i$ represents a standard deviation for batch effect i, $\widehat{\sigma_e}$ represents a standard deviation representing within-batch variation, $n_j$ represents a sample size of items in batch effect level combination j, and $t_{n^*-1, C_0\sqrt{n^*}, 1-\alpha}$ represents a $(1-\alpha)$ quantile of a non-central t-distribution with n* degrees of freedom and non-centrality parameter $C_0 \sqrt{n^*}$, where $\alpha$ is a Type I error rate associated with a confidence level.

Once a process qualifies for reduced sampling through a successful comparison of $C_{pk}$ to $C_{pk}^*$, reduced sampling and control charting may commence. (According to some embodiments, control charting may commence even though a process has not been so qualified.)

Prior to building control charts, some embodiments develop a sampling plan. Sampling plans for processes with multiple batch effects may include taking samples from every combination of batch effects. For the example of mill heats and heat treat lots, one or more samples may be obtained from every combination of mill heat and heat treat lot that occurs. The specific sampling plan may vary from process to process and is tailored to the process. The choice of how many samples to obtain from each combination of batch effects should be based on many factors, including the mean and variance components of the process and the acceptable risk of escape.

Control charts for processes with multiple batch effects account for the central tendency as well as all sources of process variation, meaning every variance term in the linear mixed model of Equations (3) and (4). Although an x-bar chart in the presence of batch effects is similar in appearance to an analogous chart for a process without batch effects, the calculation of the control limits differs significantly. Furthermore, a single range chart or moving range chart can monitor process variation without batch effects, whereas multiple charts are used to monitor the multiple variance components that exist in processes with multiple batch effects. For processes with batch effects, range charts are used to monitor within batch variation and moving range charts are used to monitor between batch variation. Note that sampling plans utilizing only a single sample per batch effect combination cannot include a range chart because there is only a single observation and calculating the range utilizes at least two observations. Therefore, within batch variation cannot be explicitly monitored using such charts. However, the within batch variation term is also present in the control limits for moving range chart, so within batch variation can be indirectly monitored through moving range charts.

FIG. 8 depicts center line 802, upper control limit 804, and lower control limit 806 formulas for x-bar and individual control charts according to one or more embodiments. For sampling plans with two or more samples per batch effect combination, an x-bar chart may be used to monitor the central tendency of the process over time. For each combination of batch effects (e.g., every combination of heat lot and mill heat that occurs in production), the selected number of samples is tested and the mean value of the test results from these samples is plotted on the x-bar chart. In order to construct the proper control limits of the x-bar chart, the proper variance is used. Non-limiting example formulas for constructing center line, upper control limit, and lower control limit for x-bar and individual control charts in the presence of two batch effects are presented below.

$$CL = \hat{\mu} \quad (12)$$

$$UCL = \hat{\mu} + 3\sqrt{\widehat{\tau_1^2} + \widehat{\tau_2^2} + \frac{\widehat{\sigma_e^2}}{n_{samp}}} \quad (13)$$

$$LCL = \hat{\mu} - 3\sqrt{\widehat{\tau_1^2} + \widehat{\tau_2^2} + \frac{\widehat{\sigma_e^2}}{n_{samp}}} \quad (14)$$

In Equations (12)-(14), $\hat{\mu}$ represents the mean of the means corresponding to each combination of batch effects, $\widehat{\sigma_1}$ represents a standard deviation of a first batch effect, $\widehat{\sigma_2}$ represents a standard deviation of a second batch effect, $\widehat{\sigma_e}$ represents a standard deviation of an error term representing within-batch variation, and $n_{samp}$ represents the number of samples per batch effect combination that will be measured under the chosen sampling plan strategy.

Equations (12)-(14) may be utilized for two batch effects. Moreover, these equations may be extended to any number of batch effects by replacing the term $\widehat{\sigma_1^2} + \widehat{\sigma_2^2}$ by the sum of the variance components for each batching variable, which may be represented, by way of non-limiting example, as follows.

$$CL = \hat{\mu} \quad (15)$$

$$UCL = \mu + 3s \quad (16)$$

$$LCL = \mu - 3s \quad (17)$$

In Equations (15), (16), and (17), 802, 804, 806, respectively, $\mu$ represents the mean of the means corresponding to each combination of batch effects, and $$s = \sqrt{\left(\sum_{i=1}^{B} \widehat{\sigma_i^2}\right) + \frac{\widehat{\sigma_e^2}}{n_{samp}}},$$

where B represents a number of batch effects, $\hat{\sigma}_i$ represents a standard deviation of batch effect i out of the plurality of batch effects, $\widehat{\sigma_e}$ represents a standard deviation of an error term representing within-batch variation, and $n_{samp}$ represents a number of samples per batch effect combination that are to be measured under the chosen sampling plan strategy.

For sampling plans that collect a single sample from each batch effect combination, an individual chart may be used in place of an x-bar chart. The construction of an individual chart is the same as the construction of an x-bar chart, except that a single measurement value is plotted for each batch effect combination rather than a mean of two or more values. The formulas to calculate the center line and control limits are the same as for the x-bar chart.

FIG. 9 depicts center line 902, upper control limit 904, and lower control limit formulas 906 for range control charts according to one or more embodiments. For processes with batch effects, range charts may be used to monitor within batch variation. For the example of FIGS. 3 and 4, having two batch effects, this within batch variation represents the variance of observations within the same heat treat lot and within the same mill heat. The range is calculated as the difference between the maximum of the samples collected from each batch effect combination and the minimum of such samples, which may be expressed, by way of non-limiting example, as follows:

$$\text{Range} = \max X_i - \min X_i \quad (18)$$

In Equation (18), $X_i$ denotes the set of samples collected from a given batch effect combination.

Non-limiting example formulas for constructing center line 902, upper control limit 904, and lower control limit 906 for range control charts in the presence of multiple batch effects, using the variance components of the linear mixed model of Equations (3) and (4), are presented below.

$$CL = d_2\sqrt{\overline{\sigma_e^2}} \quad (19)$$

$$UCL = d_2\sqrt{\overline{\sigma_e^2}} + (D_4 - 1)d_2\sqrt{\overline{\sigma_e^2}} \quad (20)$$

$$LCL = d_2\sqrt{\overline{\sigma_e^2}} + (D_3 - 1)d_2\sqrt{\overline{\sigma_e^2}} \quad (21)$$

In Equations (19), (20), and (21), $d_2$, $D_3$, and $D_4$ represent commonly used constants for control charting, available from many sources, including Appendix G of Joglekar, Anand M., *Statistical methods for six sigma: in R&D and manufacturing*, John Wiley & Sons, 2003. Note that these constants vary depending on the number of samples collected from each batch combination. The remaining terms are as described above, e.g., in reference to Equations (3) and (4). In the case of collecting only a single observation from every batch effect combination, within batch variation can be monitored indirectly through moving range charts, described presently in reference to FIG. 10.

FIG. 10 depicts center line 1004, 1012, 1020, upper control limit 1006, 1014, 1022, and lower control limit 1008, 1016, 1024 formulas for moving range control charts for two crossed batch effects according to one or more embodiments. The moving range may be expressed as the absolute value of the difference between two observations from subsequent batch combinations (for sampling plans that measure only one sample per batch combination) or the absolute value of the difference between the means of two sets of observations from subsequent batch combinations (for sampling plans that measure two or more samples per batch combination), which may be written as follows:

$$MR = |x_i - x_{i-1}|, \text{ for one-sample plans} \quad (22)$$

$$MR = |\overline{x_i} - \overline{x_{i-1}}|, \text{ for greater-than-one-sample plans} \quad (23)$$

In general, moving range charts may be used to monitor between batch variation. In the case of multiple batching effects, there is more than one between-batch variation component. For example, with crossed batch effects for heat treat lot and mill heat, there is a between batch variation component for both heat treat lot and mill heat. This means that, for the example of two batch effects, there are three possibilities for samples from different batch combinations: samples from the same heat treat lot but different mill heats, samples from different heat treat lots but the same mill heat, and samples from different heat treat lots and different mill heats.

Note that for nested batch effects, one of these combinations will not occur. For example, if heat treat lot was nested within mill heat, samples could be from different heat treat lots but the same mill heat or they could be from different heat treat lots and different mill heats, but samples from the same heat treat lot but different mill heats would not be present.

For processes with multiple batch effects, more than one moving range chart may be constructed. The number of moving range charts may be equal to the number of possible combinations of batching variables, for crossed batch effects this number will be $2^{B-1}$ where B is the number of batching effects. For nested batch effects, the number of possible combinations of batch effects will be equal to the number of batching effects. Formulas are provided below for producing the three moving range charts for the example case with two crossed batch effects. Although expressed in terms of the ongoing example of heat treat lots and mill heats, these equations are applicable to any process with two batch effects, and expandable to additional batch effects.

Center line 1004, upper control limit 1006, and lower control limit 1008 for different heat treat lots, but the same mill heats 1002:

$$CL = d_2\sqrt{\overline{\sigma_h^2} + \frac{\overline{\sigma_e^2}}{n_{samp}}} \quad (24)$$

$$UCL = d_2\sqrt{\overline{\sigma_h^2} + \frac{\overline{\sigma_e^2}}{n_{samp}}} + (D_4 - 1)d_2\sqrt{\overline{\sigma_h^2} + \frac{\overline{\sigma_e^2}}{n_{samp}}} \quad (25)$$

$$LCL = d_2\sqrt{\overline{\sigma_h^2} + \frac{\overline{\sigma_e^2}}{n_{samp}}} + (D_3 - 1)d_2\sqrt{\overline{\sigma_h^2} + \frac{\overline{\sigma_e^2}}{n_{samp}}} \quad (26)$$

Center line 1012, upper control limit 1014, and lower control limit 1016 for the same heat treat lot, but different mill heats 1010:

$$CL = d_2\sqrt{\overline{\sigma_m^2} + \frac{\overline{\sigma_e^2}}{n_{samp}}} \quad (27)$$

$$UCL = d_2\sqrt{\overline{\sigma_m^2} + \frac{\overline{\sigma_e^2}}{n_{samp}}} + (D_4 - 1)d_2\sqrt{\overline{\sigma_m^2} + \frac{\overline{\sigma_e^2}}{n_{samp}}} \quad (28)$$

$$LCL = d_2\sqrt{\overline{\sigma_m^2} + \frac{\overline{\sigma_e^2}}{n_{samp}}} + (D_3 - 1)d_2\sqrt{\overline{\sigma_m^2} + \frac{\overline{\sigma_e^2}}{n_{samp}}} \quad (29)$$

Center line 1020, upper control limit 1022, and lower control limit 1024 for the same heat treat lot, but different mill heats 1018:

$$CL = d_2\sqrt{\overline{\sigma_m^2} + \frac{\overline{\sigma_e^2}}{n_{samp}}} \quad (30)$$

$$UCL = d_2\sqrt{\overline{\sigma_m^2} + \overline{\sigma_h^2} + \frac{\overline{\sigma_e^2}}{n_{samp}}} + (D_4 - 1)d_2\sqrt{\overline{\sigma_m^2} + \overline{\sigma_h^2} + \frac{\overline{\sigma_e^2}}{n_{samp}}} \quad (31)$$

$$LCL = d_2\sqrt{\overline{\sigma_m^2} + \overline{\sigma_h^2} + \frac{\overline{\sigma_e^2}}{n_{samp}}} + (D_3 - 1)d_2\sqrt{\overline{\sigma_m^2} + \overline{\sigma_h^2} + \frac{\overline{\sigma_e^2}}{n_{samp}}} \quad (32)$$

The terms in Equations (24)-(32) are as described above, e.g., in reference to Equations (19)-(21). Note that the formulas for each case include the variance terms for batch effect variables that are different, but not for batch effect variables that are the same. This pattern may be used to extend these formulas to produce moving range charts for any number of batching variables.

Figure 11:
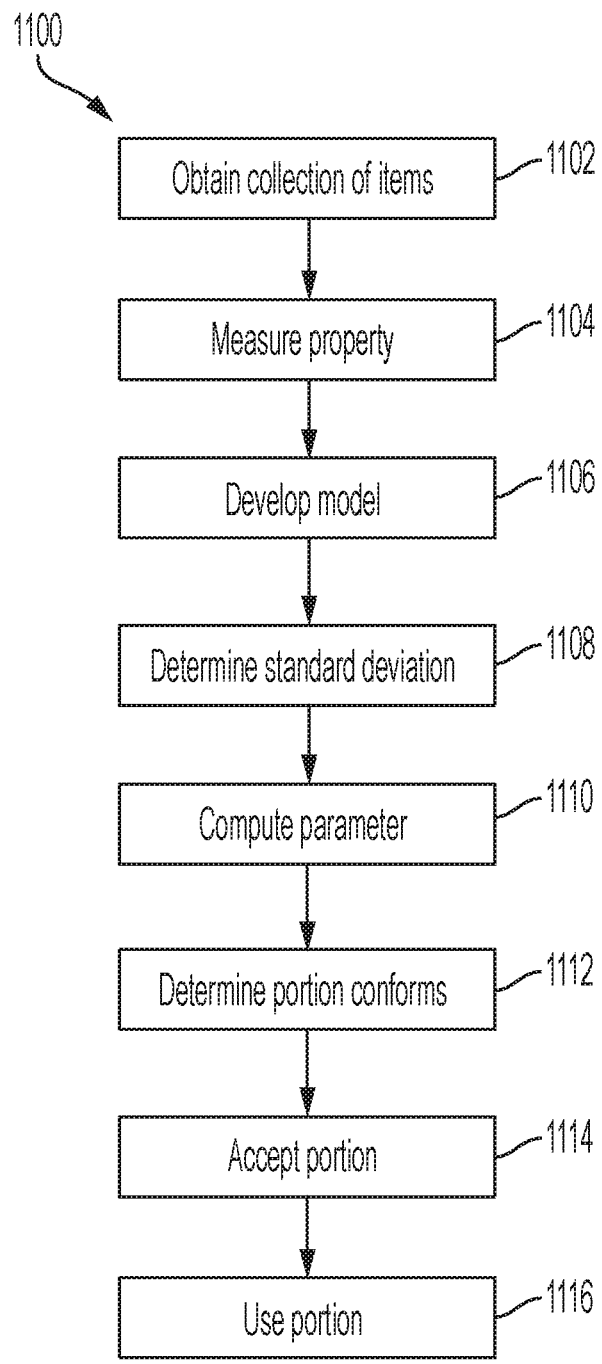
FIG. 11 is a flow diagram of a method of manufacturing statistical process control in the presence of multiple batch effects according to one or more embodiments.

FIG. 11 is a flow diagram of a method 1100 of manufacturing statistical process control in the presence of multiple batch effects according to one or more embodiments. The method 1100 may utilize any, or a combination, of techniques shown and disclosed above in reference to FIGS. 1-10. The method 1100 may be performed using the system shown and described below in reference to FIG. 12. The method 1100 may be used to qualify for use in an overall manufacturing process items produced by a bulk manufacturing process that has multiple batch effects.

At block 1102, the method 1100 obtains a collection of items produced by a bulk manufacturing process that has multiple batch effects. The items may be parts to be used in the overall manufacturing process. The number of batch effects may be two or more. The batch effects may be nested or crossed. The items may be obtained from a parts supplier, for example. Alternately, or in addition, the items may be produced by an in-house manufacturing process that has multiple batch effects. The items may be obtained by receiving a shipment, or by manufacturing them, for example.

At block 1104, the method 1100 measures a quantifiable property of a sample of items from the collection of items. The sample of items may be the totality of the collection or a subset, the latter, e.g., according to a sampling plan. The quantifiable property may be any measurable property, such as: weight, tensile strength, length, relative position (e.g., separation distance, angle, etc.), and the like. The measuring may be performed by an appropriate measuring instrument, e.g., using a test bed. The test bed may be equipped with a scale, calipers, a load cell, a thermometer, etc. The measurements may be conveyed to a computer automatically by the test bed, or manually, by a technician entering the measurements.

At block 1106, the method 1100 develops a linear mixed model for the quantifiable property based on the measurements obtained per block 1104. The model may be developed by forming an equation such as Equation (3) or (4) for calculating the proper variance components to determine $C_{pk}$ or $C_{pk}*$. The equation may be stored in the memory of a computer, for example.

At block 1008, the method 1100 determines a statistical process control standard deviation for the collection of items based on the linear mixed model. The determination may be performed by a processor of a programmed computer. The determination may be performed according to Equation (6), for example.

At block 1010, the method 1100 computes a statistical process control parameter from the statistical process control standard deviation. The statistical process control parameter may be any of a variety of parameters as disclosed herein. For example, according to various embodiments, the parameter may be a process capability index (e.g., using Equation (5) or (8)), a standard deviation (e.g., using Equation (6) or (7)), an effective sample size (e.g., using Equation (9) or (11)), a process capability index requirement (e.g., using Equation (10) together with Equation (9) or (11)), an upper control limit (e.g., using Equations (16), (20), (25), (28), or (31)), or a lower control limit (e.g., using Equations (17), (21), (26), (29), or (32)). The computation may be performed by a programmed computer.

At block 1112, the method 1100 determines that at least a portion of the collection of items conform to the statistical process control parameter. For example, if the statistical control parameter is either a process capability index or a process capability index requirement, the actions of this block may include determining that $C_{pk} \geq C_{pk}*$. As another example, if the statistical control parameter is an upper control limit, the actions of this block may include determining that all data points (e.g., individual points, x-bar points, range points, or moving range points) developed from measurements in a sample are below such an upper control limit. As yet another example, if the statistical control parameter is a lower control limit, the actions of this block may include determining that all data points (e.g., individual points, x-bar points, range points, or moving range points) developed from measurements in a sample are above such a lower control limit.

At block 1114, the method 1100 accepts the portion of the collection of items that are determined to conform to the statistical process control parameter per block 1112. The actions of this block may include, for example, passing the portion of items to a location for use in the overall manufacturing process.

At block 1116, the method 1100 uses the portion of the collection of items in the overall manufacturing process. The actions of this block may include, for example, installing, introducing, or otherwise using the items in partially-built products made by the overall manufacturing process. For example, if the items are forged metal jet engine turbines, and the overall manufacturing process is for jet aircraft, then the actions of this block may include installing the turbines in partially-built jet engines per the overall manufacturing process.

Figure 12:
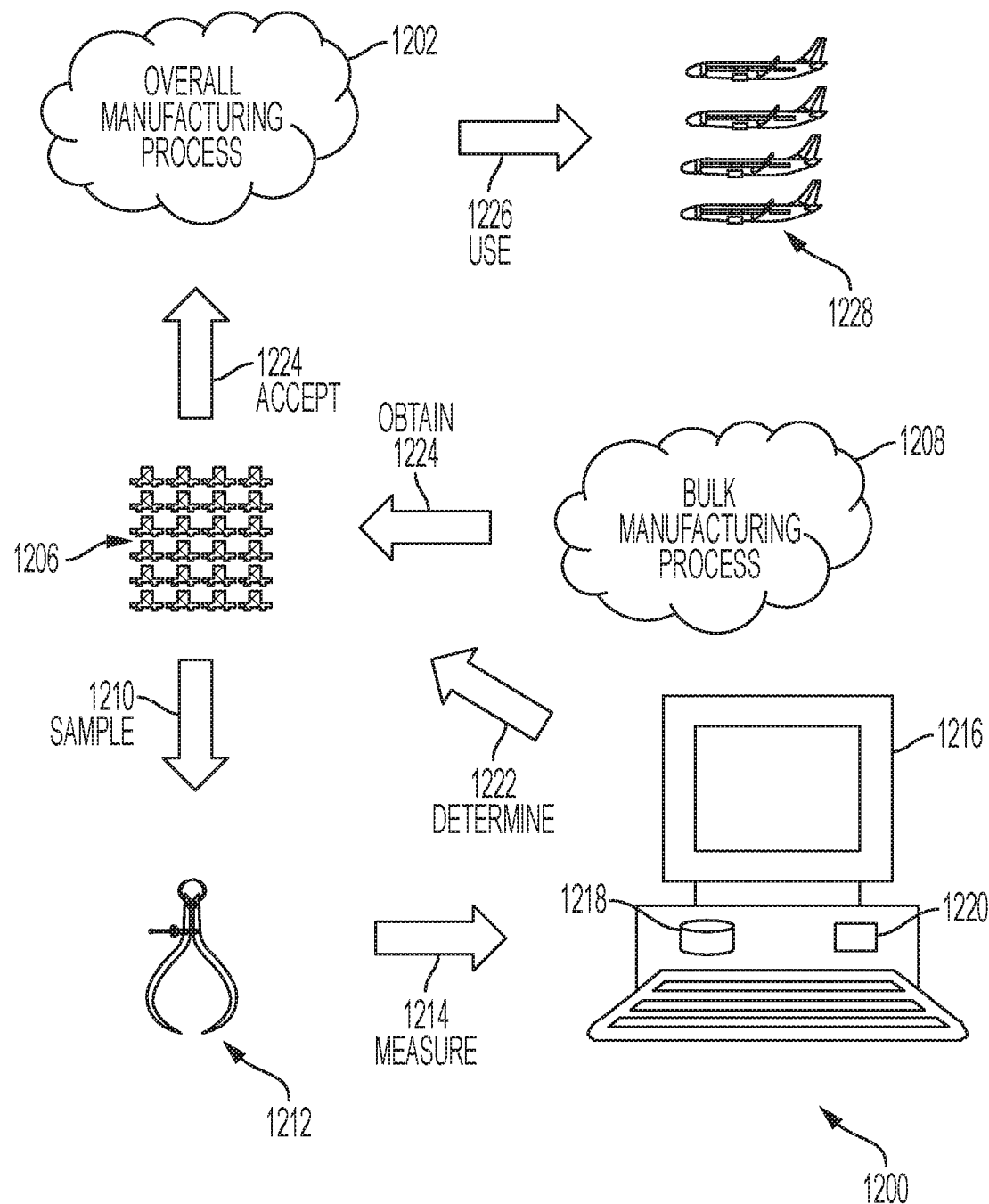
FIG. 12 is a schematic diagram of a system for manufacturing statistical process control in the presence of multiple batch effects according to one or more embodiments.

FIG. 12 is a schematic diagram of a system 1200 for manufacturing statistical process control in the presence of multiple batch effects according to one or more embodiments. The system 1200 includes an electronic computer 1216, which includes electronic memory 1218 (e.g., persistent and/or dynamic) and at least one electronic processor 1220 for executing instructions stored on memory 1218.

System 1200 may obtain 1204 a collection of items 1206 created using a bulk manufacturing process 1208 that includes multiple (i.e., two or more) batch effects. Once obtained, at least a portion of the items are sampled 1210 and measured 1214, e.g., using a test bed 1212 equipped with an instrument for measuring a property of interest. The measurements are provided to the computer 1216, which determines 1222 that at least a portion of the items are compliant with a statistical process control parameter computed by the computer 1216, according to the techniques set forth herein, e.g., as shown and described in reference to FIG. 11. The portion is accepted 1224 for use in an overall manufacturing process 1202, which uses 1226 the items in a product 1228 produced by the overall manufacturing process 1202, e.g., by incorporating one or more such items into product 1228.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of qualifying for use in an overall manufacturing process items produced by a bulk manufacturing process that has a plurality of batch effects, the method comprising:
   obtaining a collection of items produced by the bulk manufacturing process that has the plurality of batch effects;
   measuring a quantifiable property of a sample of items from the collection of items;
   developing a linear mixed model for the quantifiable property based on the measuring;
   determining a statistical process control standard deviation for the collection of items based on the linear mixed model;
   computing a statistical process control parameter from the statistical process control standard deviation;
   determining that at least a portion of the collection of items conform to the statistical process control parameter;
   accepting at least the portion of the collection of items; and
   using at least the portion of the collection of items in the overall manufacturing process.

2. The method of claim 1, wherein the collection of items comprise a plurality of forged metal parts.

3. The method of claim 2, wherein the plurality of batch effects comprise at least a heat treatment batch effect and a mill heat batch effect.

4. The method of claim 1, wherein the statistical process control parameter comprises a process capability index requirement.

5. The method of claim 4, further comprising implementing a statistical process control reduced sampling plan for at least one future collection of items produced by the bulk manufacturing process that has the plurality of batch effects.

6. The method of claim 4, wherein the process capability index requirement is of the form $$C_{pk}^* = \sqrt{\frac{n-1}{n}} \frac{1}{3\sqrt{n^*-1}} t_{n^*-1, C_0\sqrt{n^*}, 1-\alpha},$$

where n is a total sample size, $$n^* = \left( \frac{\sum_{i=1}^{B} \hat{\sigma}_i^2}{\left(\sum_{i=1}^{B} \hat{\sigma}_i^2\right) + \hat{\sigma}_e^2} \sum_{j \in J} \left(\frac{n_j}{n}\right)^2 + \frac{1}{n} \frac{\hat{\sigma}_e^2}{\sum_{i=1}^{B} \hat{\sigma}_i^2 + \hat{\sigma}_e^2} \right)^{-1},$$

B represents a number of batch effects, J represents a set of possible batch effect level combinations from all batch effects, $\hat{\sigma}_i$ represents a standard deviation for batch effect i, $\hat{\sigma}_e$ represents a standard deviation representing a within-batch batch variation, $n_j$ represents a sample size of items in batch effect level combination j, and $t_{n^*-1,C_0\sqrt{n^*},1-\alpha}$ represents a (1−α) quantile of a non-central t-distribution with n* degrees of freedom and non-centrality parameter $C_0\sqrt{n^*}$, where α is a Type I error rate associated with a confidence level.

7. The method of claim 1, wherein the statistical process control parameter comprises at least one of an upper control limit or a lower control limit.

8. The method of claim 7, wherein the collection of items comprises a plurality of disjoint subsets of items, each subset of the plurality of disjoint subsets of items comprising items affected by a combination of batch effects from the plurality of batch effects, and
wherein the statistical process control parameter comprises at least one of a moving range chart upper control limit for a first subset comprising items affected by a first combination of batch effects of the plurality of batch effects or a moving range chart lower control limit for a second subset comprising items affected by a second combination of batch effects of the plurality batch effects.

9. The method of claim 7, wherein the statistical process control parameter comprises at least one of an upper control limit of the form $\hat{\mu}$ +3s or $$d_2\sqrt{\widehat{\sigma_e^2}} + (D_4-1)d_2\sqrt{\widehat{\sigma_e^2}},$$

or a lower control limit of the form $\hat{\mu}$ 3s or $$d_2\sqrt{\widehat{\sigma_e^2}} + (D_3-1)d_2\sqrt{\widehat{\sigma_e^2}},$$

where $\hat{\mu}$ represents a mean associated with the quantifiable property, $$s = \sqrt{\left(\sum_{i=1}^{B} \widehat{\sigma_i^2}\right) + \frac{\widehat{\sigma_e^2}}{n_{samp}}},$$

B represents a number of batch effects, $d_2$ represents a constant for control charting, $D_3$ represents a constant for control charting, $D_4$ represents a constant for control charting, $\hat{\sigma}_i$ represents a standard deviation of batch effect i out of the plurality of batch effects, $\widehat{\sigma_e}$ represents a standard deviation of an error term representing a within-batch variation, and $n_{samp}$ represents a number of samples per batch effect combination that are to be measured under the chosen sampling plan strategy.

10. The method of claim 7, further comprising continuing a statistical process control reduced sampling plan for at least one future collection of items produced by the bulk manufacturing process that has the plurality of batch effects.

11. The method of claim 1, wherein the plurality of batch effects comprise a first batch effect crossed with a second batch effect.

12. The method of claim 1, wherein the plurality of batch effects comprise a first batch effect nested in a second batch effect.

13. The method of claim 1,
wherein the linear mixed model for the quantifiable property comprises a first standard deviation of a first batch effect, a second standard deviation of a second batch effect, and a third standard deviation of an error term representing a within-batch variation; and
wherein the statistical process control standard deviation for the collection of items based on the linear mixed model comprises the first standard deviation, the second standard deviation, and the third standard deviation.

14. The method of claim 13, wherein the statistical process control standard deviation for the collection of items based on the linear mixed mode is determined by computing $$\hat{\sigma} = \sqrt{\left(\sum_{i=1}^{B} \widehat{\sigma_i^2}\right) + \widehat{\sigma_e^2}},$$

wherein $\hat{\sigma}_i$ represents the standard deviation of batch effect i out of a plurality of B batch effects, and $\widehat{\sigma_e}$ represents the third standard deviation of the error term representing the within-batch variation.

15. The method of claim 1, wherein the linear mixed model is developed as $y_{ijk...} = a + h_j + m_k + ... + e_{ijk...}$, where $y_{ijk...}$ represents the quantifiable property for an i-th item in a j-th batch of a first batch effect and the k-th batch of a second batch effect with additional indices for additional batch effects, α represents a model intercept, $h_j$ represents a j-th batch of the first batch effect, $m_k$ represents a k-th batch of the second batch effect, "..." represents additional terms for additional batch effect variables, and $e_{ijk...}$ represents a within-batch variation.

16. The method of claim 1, wherein the statistical process control parameter comprises a process capability index.

17. The method of claim 16, wherein the process capability index is of the form $$C_{pk} = \min\left(\frac{USL - \hat{\mu}}{3\sqrt{\left(\sum_{i=1}^{B} \widehat{\sigma_i^2} + \widehat{\sigma_e^2}\right)}}, \frac{\hat{\mu} - LSL}{3\sqrt{\left(\sum_{i=1}^{B} \widehat{\sigma_i^2}\right) + \widehat{\sigma_e^2}}}\right),$$

where B represents a number of batch effects, USL represents an upper specification limit, LSL represents a lower specification limit, $\hat{\mu}$ represents a mean of the quantifiable property, $\hat{\sigma}_i$ represent a standard deviation of batch effect I from the plurality of batch effects, and $\widehat{\sigma_e}$ represents a standard deviation of an error term representing a within-batch variation.

18. A system for qualifying for use in an overall manufacturing process items produced by a bulk manufacturing process that has a plurality of batch effects, the system comprising:
a test bed for measuring a quantifiable property of a sample of items from a collection of items produced by the bulk manufacturing process that has the plurality of batch effects; and
an electronic computer comprising at least one electronic processor that executes instructions to perform operations comprising:
developing a linear mixed model for the quantifiable property based on the measuring, determining a statistical process control standard deviation for the collection of items based on the linear mixed model, computing a statistical process control parameter from the statistical process control standard deviation, and determining that at least a portion of the collection of items conform to the statistical process control parameter;

wherein at least the portion of the collection of items are accepted and used in the overall manufacturing process.

19. The system of claim 18, wherein the collection of items comprise a plurality of forged metal parts.

20. The system of claim 19, wherein the plurality of batch effects comprise at least a heat treatment batch effect and a mill heat batch effect.

21. The system of claim 18, wherein the statistical process control parameter comprises a process capability index requirement.

22. The system of claim 21, wherein the process capability index requirement is of the form $$C_{pk}^* = \sqrt{\frac{n-1}{n}} \frac{1}{3\sqrt{n^*-1}} t_{n^*-1, C_0\sqrt{n^*}, 1-\alpha},$$

where n is a total sample size, $$n^* = \left( \frac{\sum_{i=1}^{B} \hat{\sigma}_i^2}{\left(\sum_{i=1}^{B} \hat{\tau}_i^2\right) + \hat{\tau}_e^2} \sum_{j \in J} \left(\frac{n_j}{n}\right)^2 + \frac{1}{n} \frac{\hat{\tau}_e^2}{\sum_{i=1}^{B} \hat{\sigma}_i^2 + \hat{\tau}_e^2} \right)^{-1},$$

B represents a number of batch effects, $\hat{\sigma}_i$ represents a standard deviation for batch effect i, $\widehat{\sigma_e}$ represents a standard deviation representing a within-batch variation, $n_j$ represents a sample size of items in batching level combination j, and $t_{n^*-1, C_0\sqrt{n^*}, 1-\alpha}$ represents a $(1-\alpha)$ quantile of a non-central t-distribution with $n^*$ degrees of freedom and non-centrality parameter $C_0 \sqrt{n^*}$, where $\alpha$ is a Type I error rate associated with a confidence level.

23. The system of claim 18, wherein the statistical process control parameter comprises at least one of an upper control limit or a lower control limit.

24. The system of claim 23,
wherein the collection of items comprises a plurality of disjoint subsets of items, each subset of the plurality of disjoint subsets of items comprising items affected by a combination of batch effects from the plurality of batch effects, and wherein the statistical process control parameter comprises at least one of a moving range chart upper control limit for a first subset comprising items affected by a first combination of batch effects of the plurality of batch effects or a moving range chart lower control limit for a second subset comprising items affected by a second combination of batch effects of the plurality batch effects.

25. The system of claim 23, wherein the statistical process control parameter comprises at least one of an upper control limit of the form $\hat{\mu}$ 3s or $$d_2 \sqrt{\widehat{\sigma_e^2}} + (D_4 - 1) d_2 \sqrt{\widehat{\sigma_e^2}},$$

or a lower control limit of the form $\hat{\mu}$ −3s or $$d_2 \sqrt{\widehat{\sigma_e^2}} + (D_3 - 1) d_2 \sqrt{\widehat{\sigma_e^2}},$$

where $\hat{\mu}$ represents a mean associated with the quantifiable property, $$s = \sqrt{\left(\sum_{i=1}^{B} \hat{\sigma}_i^2\right) + \frac{\widehat{\sigma_e^2}}{n_{samp}}},$$

B represents a number of batch effects, $d_2$ represents a constant for control charting, $D_3$ represents a constant for control charting, $D_4$ represents a constant for control charting, $\hat{\sigma}_i$ represents a standard deviation for batch effect i, and $\widehat{\sigma_e}$ represents a standard deviation of an error term representing within-batch variation.

26. The system of claim 18, wherein the plurality of batch effects comprise a first batch effect crossed with a second batch effect.

27. The system of claim 18, wherein the plurality of batch effects comprise a first batch effect nested in a second batch effect.

28. The system of claim 18,
wherein the linear mixed model for the quantifiable property comprises a first standard deviation of a first batch effect, a second standard deviation of a second batch effect, and a third standard deviation of an error term representing a within-batch variation; and wherein the statistical process control standard deviation for the collection of items based on the linear mixed model comprises the first standard deviation, the second standard deviation, and the third standard deviation.

29. The system of claim 28, wherein the statistical process control standard deviation for the collection of items based on the linear mixed mode is determined by computing $$\hat{\sigma} = \sqrt{\left(\sum_{i=1}^{B} \hat{\sigma}_i^2\right) + \widehat{\sigma_e^2}},$$

wherein $\hat{\sigma}_i$ represents a standard deviation of batch effect i of the plurality of batch effects, B represents a number of batch effects, and $\widehat{\sigma_e}$ represents the third standard deviation of the error term representing the within-batch variation.

30. The system of claim 18, wherein the linear mixed model is developed as $y_{ijk\ldots} = a + h_j + m_k + \ldots + e_{ijk\ldots}$, where $y_{ijk\ldots}$ represents the quantifiable property of the i-th item in a j-th batch of a first batch effect and a k-th batch of a second batch effect with possible additional indices for additional batch effects, a represents a model intercept, $h_1$ represents a j-th batch of the first batch effect, $m_k$ represents the k-th batch of the second batch effect, "..." represents additional terms for additional batch effect variables, and $e_{ijk\ldots}$ represents a within-batch variation.

31. The system of claim 18, wherein the statistical process control parameter comprises a process capability index.

32. The system of claim 31, wherein the process capability index is of the form $$C_{pk} = \min\left( \frac{USL - \hat{\mu}}{3\left(\left(\sum_{i=1}^{B} \widehat{\sigma_t^2}\right) + \widehat{\sigma_e^2}\right)}, \frac{\hat{\mu} - LSL}{3\left(\left(\sum_{i=1}^{B} \widehat{\sigma_t^2}\right) + \widehat{\sigma_e^2}\right)} \right),$$

where B represents a number of batch effects, USL represents an upper specification limit, LSL represents a lower specification limit, $\hat{\mu}$ represents a mean of the quantifiable property, $\hat{\sigma}_t$ represents a standard deviation of batch effect i out of the plurality of batch effects, and $\widehat{\sigma_e}$ represents a standard deviation of an error term representing a within-batch variation.

* * * * *